United States Patent [19]

Habu

[11] Patent Number: 4,539,868
[45] Date of Patent: Sep. 10, 1985

[54] METHOD AND APPARATUS FOR OPTIMIZED GEAR SHIFTING INDICATION

[75] Inventor: Nobuo Habu, Susono, Japan

[73] Assignee: Toyota Jidosha Kabushiki Kaisha, Toyota, Japan

[21] Appl. No.: 474,325

[22] Filed: Mar. 11, 1983

[30] Foreign Application Priority Data

Jun. 4, 1982 [JP] Japan .................. 57-96841

[51] Int. Cl.³ ............... B60K 41/08; G07C 5/08; G09B 19/16; B60Q 1/00
[52] U.S. Cl. .................. 74/864; 74/866; 364/424.1; 364/442; 340/52 F
[58] Field of Search ............... 74/863, 866, 862, 864; 364/424.1, 442; 123/480; 434/71; 340/52 F, 52 R

[56] References Cited

U.S. PATENT DOCUMENTS

| | | | |
|---|---|---|---|
| 4,150,497 | 4/1979 | Weber | 434/71 |
| 4,198,882 | 4/1980 | Kiencke et al. | 74/866 |
| 4,294,341 | 10/1981 | Swart | 74/866 |
| 4,320,381 | 3/1982 | Olivier | 340/52 F |
| 4,350,057 | 9/1982 | Kishi et al. | 74/866 |
| 4,354,173 | 10/1982 | Kuhn et al. | 340/52 F |
| 4,355,296 | 10/1982 | Drone | 434/71 X |
| 4,411,174 | 10/1983 | Yokoi et al. | 74/865 X |
| 4,428,257 | 1/1984 | Meyerle et al. | 74/866 |
| 4,438,423 | 3/1984 | Stier | 434/71 X |
| 4,439,158 | 3/1984 | Weber | 434/71 |
| 4,463,427 | 7/1984 | Bonnetain et al. | 74/866 X |

FOREIGN PATENT DOCUMENTS

| | | | |
|---|---|---|---|
| 2748227 | 6/1978 | Fed. Rep. of Germany | 74/863 |
| 3128080 | 2/1983 | Fed. Rep. of Germany | 74/866 |
| 6235 | 1/1979 | Japan | 74/866 |
| 2030661 | 4/1980 | United Kingdom | 74/866 |
| 2091358 | 7/1982 | United Kingdom | |

Primary Examiner—Allan D. Herrmann
Assistant Examiner—Stephen B. Andrews
Attorney, Agent, or Firm—Cushman, Darby & Cushman

[57] ABSTRACT

A method for indicating gear shifting operation to be performed which comprises the steps of calculating current engine load from the intake air flow Q and the number of engine rotations (i.e. engine speed), comparing the current engine load thus calculated with a predetermined engine load constant, calculating current shift position from the result of the comparison, seeking a first engine load operation function $Y=f(N)$ and a second engine load operation function $\beta=g(N)$ from known equal fuel consumption rate curves, comparing the first engine load operation function Y thus sought with said current engine load Q/N, and indicating either shift-up or shift-down operation to be performed by a driver in accordance with the result of the comparison. According to the method according to the present invention, preferable shift positions to be performed in the optimum fuel consumption rate can be thereby enabling the maximum engine fuel consumption performance to be carried out during running of a car.

17 Claims, 11 Drawing Figures

METHOD AND APPARATUS FOR OPTIMIZED GEAR SHIFTING INDICATION

BACKGROUND OF THE INVENTION

1. Field of the Invention

The present invention relates to a method for performing gear shifting operation and indication for a vehicle having a manual transmission, more particularly to a method for indicating a driver gear shifting operation capable of running at a preferable shift position for optimum fuel consumption rate and an apparatus for realizing the method.

2. Description of the Prior Art

Recently, the situation and circumstance surrounding supply of oils has deteriorated and various research and development activities have been made in an attempt to improve efficient utilization of energy in each technical field in each industry. The situation is the same in the automobile industry, where various researches and developments for improving engines with better thermal efficiencies and for pursuing better methods for performing effective combustion of fuel for vehicles with less fuel consumption rate are sought. However, there is a problem that unless operations including acceleration operation and gear shifting operation are considered, it is not possible for a driver to sufficiently demonstrate the improved fuel consumption performance thus reached.

As a solution for this problem, a method for indicating to a driver preferable shift positions in optimum fuel consumption rates in g/ps. h corresponding to all running conditions are stored in a memory in advance as a data map and various calculations are performed in accordance with the data map and information signals detected by different detectors.

Although the above method results in preferable gear shifting indication to the driver relating to optimum fuel consumption, the problem is that a large number of memory elements or a large memory capacity is required in order to store voluminous data.

It turns out through many experiments done by the applicant that; supposing that the fuel consumption rate determined by the number of engine rotations N in rev./min and the engine load Q/N in 1/rev. is at the point G in the graph shown in FIG. 1 and one step shift-up operation is performed from the current shift position, the number of engine rotations N (i.e, engine speed) necessary for maintaining the same car speed in km/h in this condition is necessarily determined by the gear ratio of a transmission. Also, the horse power PS in ps necessary for maintaining the car speed is considered almost unchanged even if shifting is performed so that an expected engine load Q/N when shifting up one step can be calculated therefrom, and the fuel consumption rate after one step shift-up moves to G' in the graph or data map in FIG. 1. However, the angle of inclination α formed by the line connecting the two points G and G' and the horizontal line remains almost unchanged, regardless of shifting up and down for all running conditions, and it was confirmed by the applicant of this application that the angle is determined only by the conditions of the manual transmission.

Moreover, the equal fuel consumption rate curves F shown in FIG. 2 are prepared by plotting equal values among the fuel consumption rates determined by the number of engine rotations (i.e., engine speed) and the engine load Q/N. In FIG. 2, supposing that the current fuel consumption rate is located at the point J, the new position in the fuel consumption rate data map after shifting up moves to the point J' and it is preferable to perform a shift-up operation in view of the fuel consumption rate.

Alternatively, if the current fuel consumption rate is located at the point K, the fuel consumption rate K when performing shift-down operation moves to the point K' and it is apparent that the shift-down operation is favorable in view of the fuel consumption rate.

SUMMARY OF THE INVENTION

It is therefore an object of the present invention to provide a method for performing gear shifting operation and indication in which a preferable car running in the optimum fuel consumption rate can be carried out by indicating to a driver the preferable shift positions to be performed for the optimum fuel consumption rate.

According to one feature of the present invention, the method for performing gear shifting operation and indication is characterized in that the method comprises the steps of defining a function based on current engine load Q/N from the engine speed N in accordance with the fuel consumption rate curves, calculating current engine load Q/N from such function in accordance with the current engine speed N, calculating an expected engine load Q'/N' necessary for maintaining the same car speed in a shift position of a transmission after performing gear shifting, comparing the current engine speed N with the expected or assumed engine load Q'/N' thus calculated, determining a preferable shift position associated with the optimum fuel consumption rate for gear shifting in accordance with the result of the comparison together with the current shift position and the engine load after gear shifting, and indicating gear shifting instructions in accordance with the result thus determined.

These and other objects and advantages of the present invention will be understood from the following detailed description in conjunction with the accompanying drawings.

DETAILED DESCRIPTION OF THE PREFERRED EMBODIMENT

Figure 1:
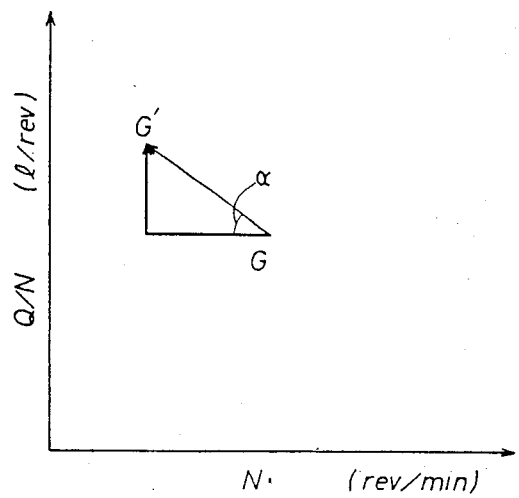
FIG. 1 illustrates a characteristic of the engine speed N and engine load Q/N for explaining a change in the fuel consumption rate when shifting up.
Figure 2:
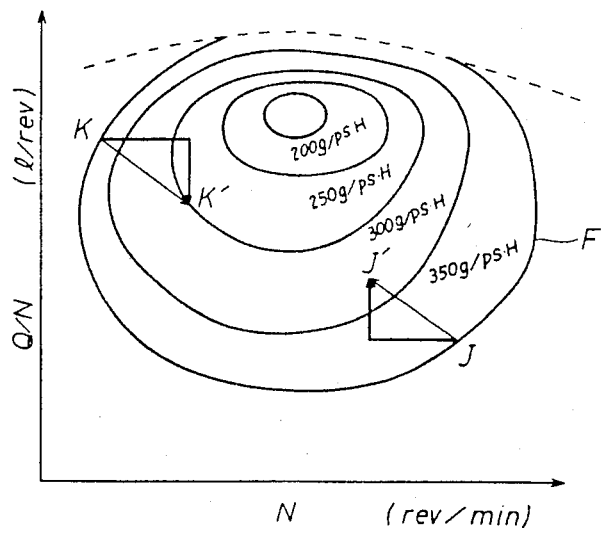
FIG. 2 illustrates characteristic curves of an equal fuel consumption rate data map for use in the present invention.
Figure 3:
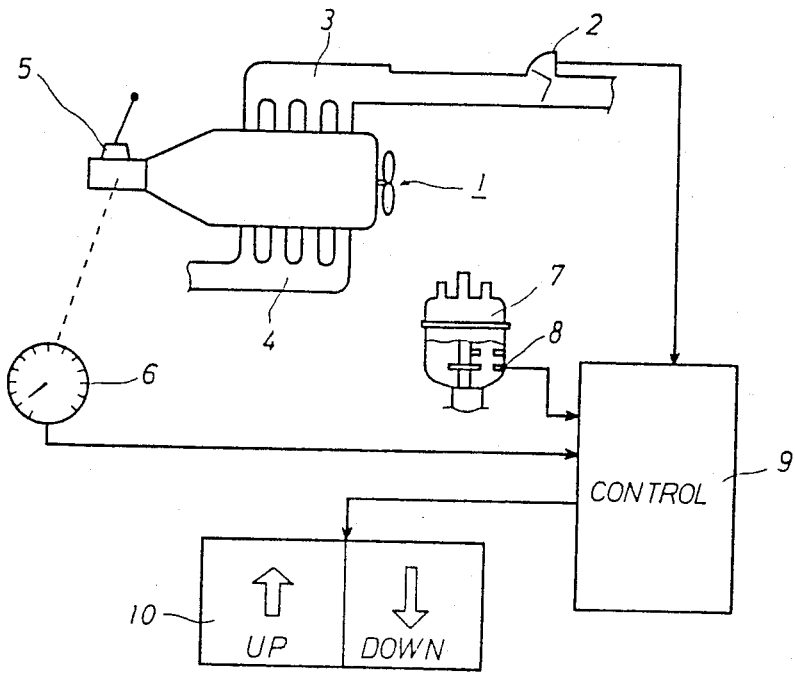
FIG. 3 illustrates an overall control system including an engine according to the present invention.

Referring to FIG. 3, an overall control system for realizing the method for performing gear shifting operation and indication according to the present invention comprises an engine 1, an air flow meter 2 for measuring intake air flow, an intake manifold 3 for distributing the intake air to each piston of the engine 1, and exhaust manifold for collecting the exhaust gas ejected from each piston of the engine 1 and for supplying it to a muffler (not shown), a transmission 5 coupled to the output shaft of the engine 1, a rotation speed meter 6 for detecting and indicating the rotation speed of the output shaft of the transmission 5, i.e. the car speed, a distributor 7 which rotates once for every two revolutions of a crank shaft of the engine 1 and which distributes a high current to an ignition plug of each cylinder of the engine, and a rotation sensor 8 mounted within the distributor 7 for producing twenty four pulse signals for every one revolution of the distributor 7.

Figure 4:
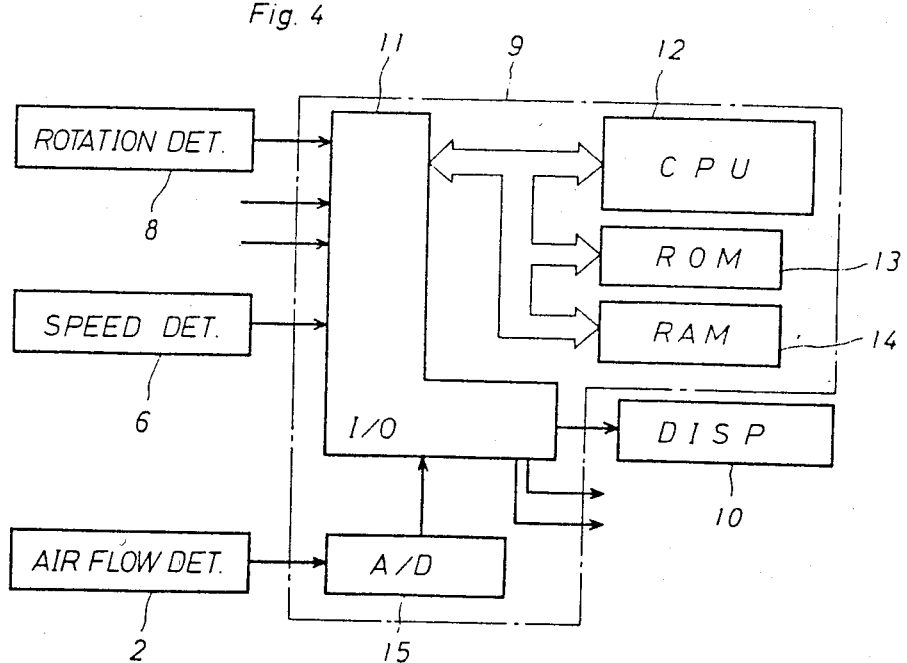
FIG. 4 illustrates a control unit including a microcomputer, different sensors and an indicator for indicating gear shifting operations to be performed according to the present invention.

Reference numeral 9 indicates a conrol unit, the detailed construction of which is shown in FIG. 4. The input of the control unit 9 is connected to the outputs of each of air flow meter 2, speed meter 6 and the rotation sensor 8 mounted within the distributor 7 so that the control unit 9 receives each detected signal from the meters and sensor and controls the engine 1, while it desired gear shifting operation and produces an output signal for indicating on indicator 10 the shift operations to be performed.

In FIG. 4, the control unit 9 comprises an input/output port 11 which is refered to hereafter as I/O port, a central processing unit (CPU) 12, a read only memory (ROM) 13, a random access memory (RAM) 14, and an analog to digital converter (A/D converter) 15. The inputs of the I/O port 11 are connected to the air flow meter 2 through the A/D converter 15 as well as to the speed meter 6 and the rotation sensor 8 and the output of the I/O port 11 is connected to the indicator 10 for indicating the gear shifting operation to be performed. The ROM stores in advance a control program for gear shifting operation and indication and for performing engine control as well as data maps for calculating various engine loads etc. together with the detected data by the meters and sensor. The RAM can temporarily store different data detected by the meters 2, 6 and sensor 8 in order to calculate engine loads etc. in accordance with the data map.

The operation of the overall control system and the control unit shown in FIGS. 3 and 4 will now be made with reference to the control program chart shown in FIG. 5 according to one embodiment of the present invention.

Figure 5:
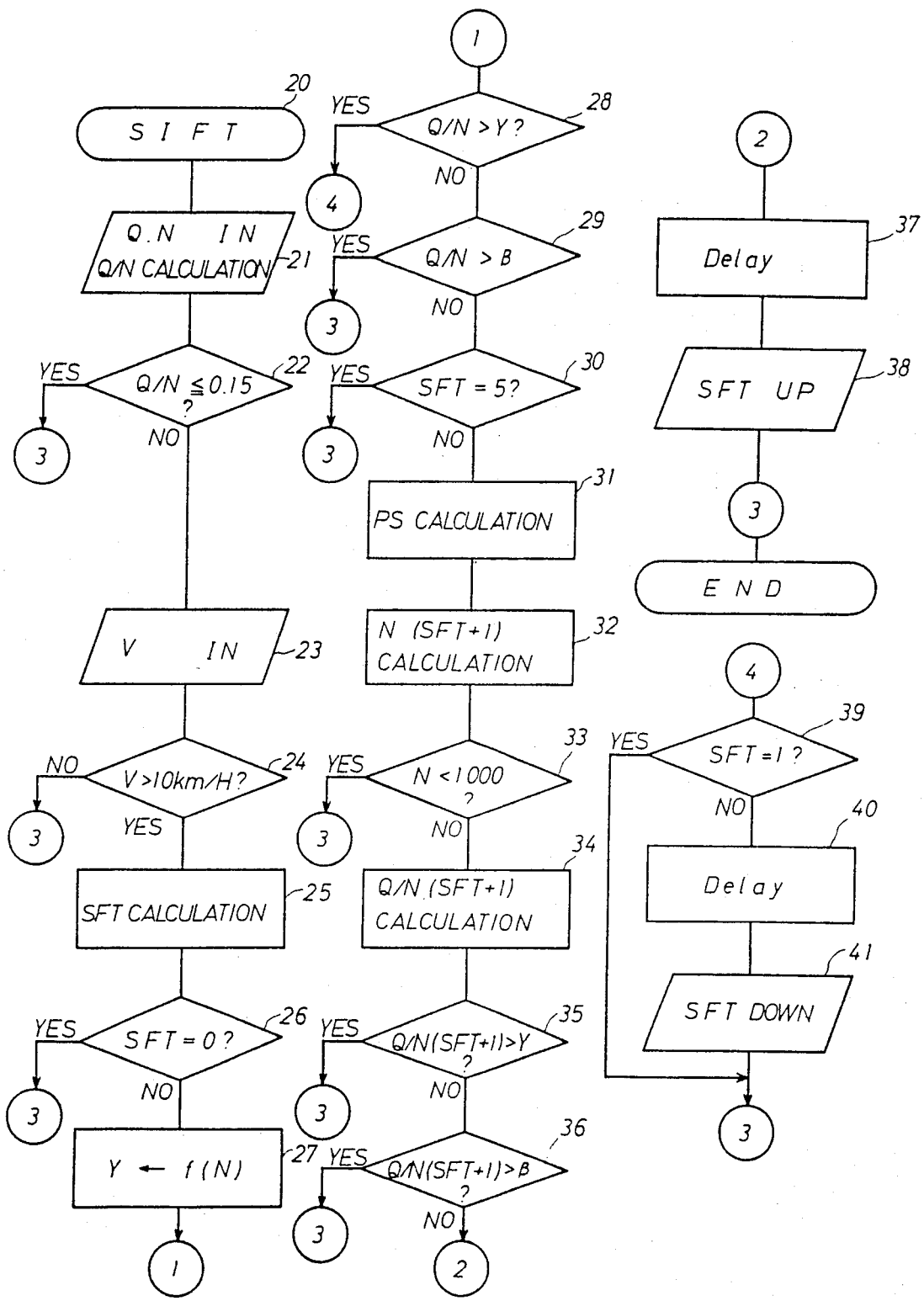
FIG. 5 illustrates an control program flow chart for use in the control unit shown in FIG. 4, according to the present invention.

In FIG. 5, the step 20 starts the shift operation or processing of a main routine not shown by timer signals which are produced at a predetermined timing, (for example, once every 10 minutes) in the control program as necessary for car running. Next, in the step 21 after the shift program operation was started, information signals or data detected by the rotation sensor 8 and the air flow meter 2 are stored into the RAM and then read from the RAM into the CPU 12. The CPU 12 calculates the engine load Q/N in accordance with the engine speed N in rev./min or rpm and intake air flow Q in 1/min.

Figure 6:
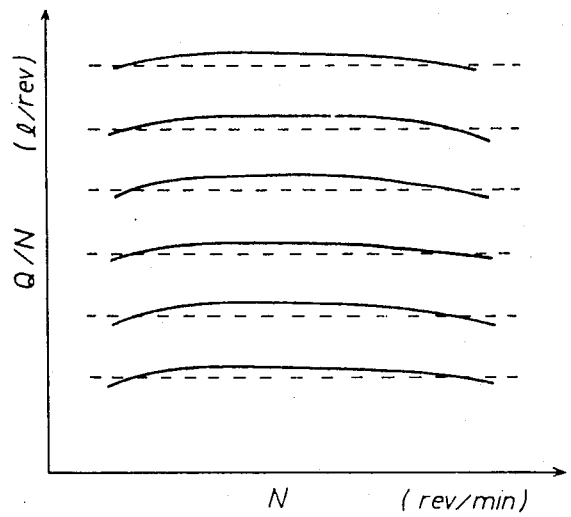
FIG. 6 illustrates engine load line characteristic curves for use in calculating engine load from the engine speed.

FIG. 6 shows engine load curves in solid lines which are obtainable by connecting points representing equal engine loads Q/N for various engine speeds. In practice, however, for the purpose of simplifying calculations, the solid curves are considered as being straight lines as shown in the dotted lines and the engine load Q/N can be thus sought.

In the step 22, the engine load Q/N calculated in the step 21 is compared with a predetermined value, (for example, 0.15) and it is then determined whether or not the engine load is equal to or smaller than the predetermined value. If the result of the comparison is YES, i.e. $Q/N \leq 0.15$, it means that the air flow Q passing through the air flow meter 2 is small in the current running conditions, and a reduced speed condition of the car is determined and the shift program terminates without further execution of the program. However, if the result of the comparison is not $Q/N \leq 0.15$, the next step 23 is executed. In this step 23, the car speed V is read from the speed meter 6 and now the operation moves to the step 24.

In the step 24, the car speed V obtained in the previous step 23 is compared with 10 km/h and it is then determined whether or not the former is larger than the latter. If the result of the comparison is $V \leq 10$, it means that the just-after-shift condition exists, so that the operation of the program terminates as there is no necessity of a shift indication. However, if the result of the comparison is $V > 10$, now the operation step moves to the next step 25 by determining that it is in normal running condition.

In the step 25, the current shift position is calculated from the current car speed V, the current engine speed N, and the transmission (or gear) ratio of the transmission 5, and the operation then moves to the next step.

In the step 26, a determination is made as to whether or not the current shift position is the neutral position. If the result of the determination is YES, i.e. the result is in the neutral position, the program terminates without peforming the subsequent operations as it is not in a normal running condition. However, if the result of the determination is NO, i.e. the current shift position is not in the neutral position, the operation now moves to the next step. In this case, when the clutch operation is performed, the result of the determination is considered as being in the neutral position since the transmission ratio corresponding to the current car speed V and the current engine speed N differs from that of the transmission.

Figure 7:
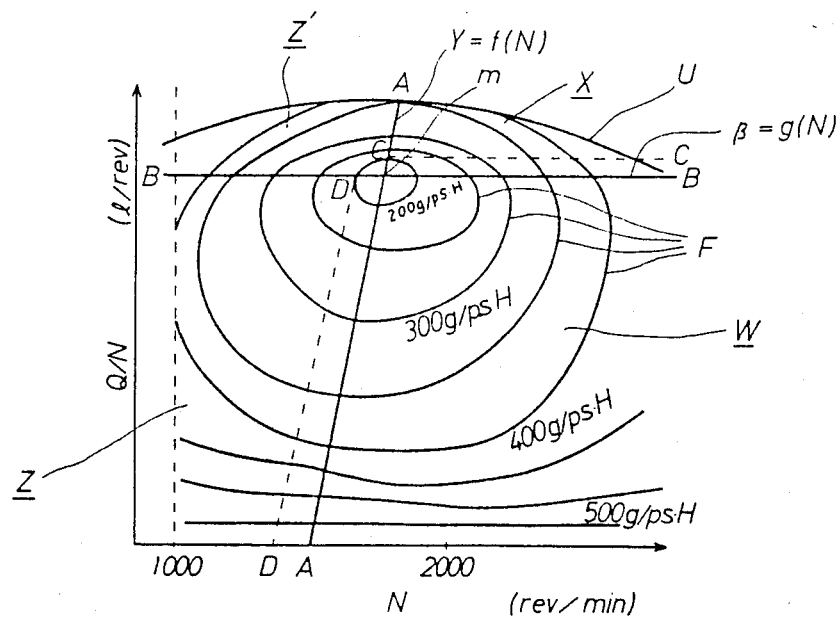
FIG. 7 illustrates a fuel data map stored in a ROM for calculating various fuel consumption rates and engine loads.

In the step 27, an engine load is calculated from the fuel consumption rate map according to the present invention as shown in FIG. 7 in which equal fuel consumption rate curves are defined by the engine characteristics. Namely, the operating engine load Y on the line A—A which corresponds to the current engine speed is calculated in accordance with function $Y = f(N)$ which is defined in accordance with equal fuel consumption rate curves F. In this case, the line A—A which divides the equal fuel consumption rate curves is set as the straight line passing through the center m of the curves F and also passing through within the discrepancy range which is located in the lowest points of the engine load Q/N in each equal fuel consumption rate curve.

Furthermore, the equal fuel consumption rate curves in FIG. 7 are prepared by plotting the equal fuel rate points determined through experiments and which are defined by engine speed N and engine loads Q/N. Accordingly, when running in a certain point on the same equal fuel the consumption rate curve, the same fuel consumption rate is found even if the engine speed and the engine load Q/N differ from each other.

In the step 28, the engine load Y calculated in the previous step 27 is compared with the current engine load Q/N. If the result of the comparison is Q/N>Y, then it is preferable to perform the shift down operation in view of the fuel consumption rate, and the operation moves to steps 39 through 41 for indicating the desired shift down operation.

In the step 39, a determination or decision is made if the current shift position T is in the first speed, i.e. SFT=1. If the result of the determination is YES, i.e. SFT=1, the program terminates since further shift-down operation cannot be possible. However, if the result of the determination is SFT≠1, then the operation now moves to the step 40.

In the step 40, if the current engine load Q/N is equal to the engine load Y which was calculated in accordance with the function Y=f (N), a delay time operation which delays the progression of the program by an appropriate time is performed so as to prevent driver confusion due to the possible occurrence of intermittent illumination of a shift-down lamp in a short period, and then the operation moves to the step 41.

In the step 41, an operation for performing an indication of the shift-down operation is carried out and, after that, the program terminates. More detailed explanation will now be made with respect to the steps 39 through 41.

Figure 8:
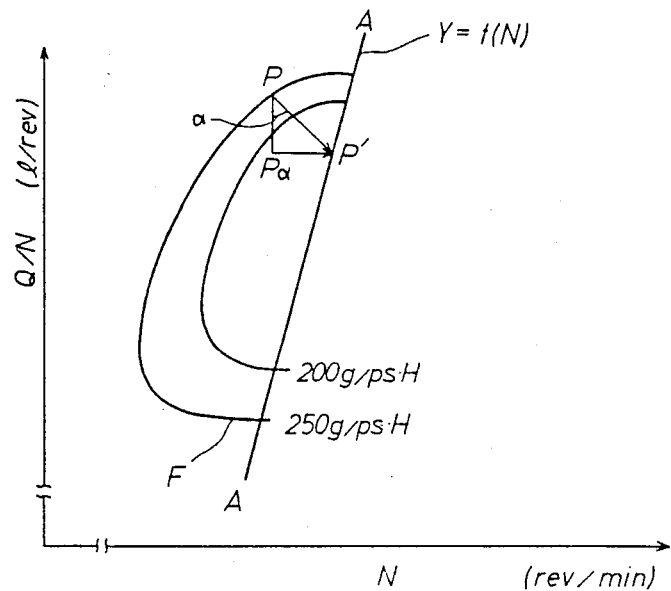
FIG. 8 illustrates a portion of the fuel data map for explaining the operation of respective engine loads and engine consumption rates.

First of all, refering to FIG. 8 which is a partial view of FIG. 7, it is obvious from the figure that the equal fuel consumption rate curves F have preferred conditions toward the internal direction of the curves. If the current engine load Q/N is located above the line A—A, for instance, at the point P, so that the engine speed N' and the engine load Q'/N' do not result in the decrease of the car speed V due to performing of the shift-down operation and maintaining the same horse power PS, it is calculated for the engine load Q/N to decrease, from the horse power P to Pα and the engine speed N' increases by the same relative increment as the horse power P to Pα, thus reaching the value at the point P'. However, according to the equal fuel consumption rate curves F, the fuel consumption rate in this case is improved from 250 g/ps. h to more than 200 g/ps. h.

From this fact, if the current engine load Q/N is situated above the line A—A, the fuel consumption rate can be improved by indicating on the indicator 10 the that a shift-down should be performed.

On the other hand, if the result of the determination in the previous step 28 is Q/N≦Y, the next step 29 is executed.

Figure 9:
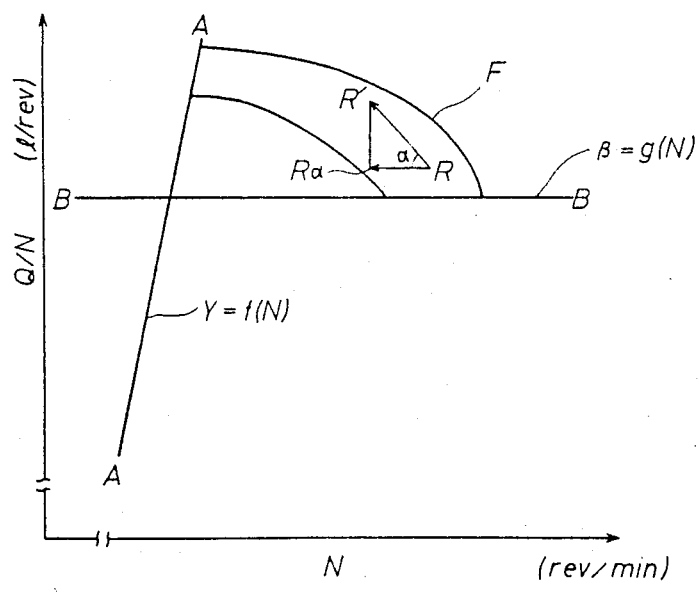
FIG. 9 illustrates a portion of an enlarged fuel data map of FIG. 7 for explaining the operation of the fuel data map and for calculating engine load in one zone.

In the step 29, a decision-making is performed determine to whether or not the current engine load Q/N is in a high load condition, that is, whether the current engine load Q/N is above the engine load β which is divided by the straight line B—B as shown in FIG. 7. In FIG. 9, the line B—B shows a function β=g (N) which passes through approximate center m of the equal fuel consumption rate curves F. In the FIG. 7, tangential inclination of each equal fuel consumption rate curve F is inverted with the line B—B being the border line thereof. As shown in FIG. 8 which is a partial view of FIG. 7, in the current running condition in the equal fuel consumption rate shown at the point R, when the engine speed N and the engine load Q/N in which the car speed V remains unchanged with the same horse power PS maintained, are calculated by shifting up one step from the current shift position, the engine speed N decreases or lowers from R to Rα and the engine load Q/N increases from Rα to R', thus reaching the value shown at the point R'. However, according to the equal fuel consumption rate curves F, even if the shift-up operation is performed at the point R of the fuel consumption rate in the current running conditions, almost no change in the fuel consumption rate can be received.

Accordingly, when the result of the decision is Q/N≦Y and the current engine load Q/N is higher than β in the step 29, either shift-down or shift-up operation is required, thus terminating the program execution. However, if the current engine load Q/N is lower than β, the step now moves to the step 30.

In the step 30, the current shift position SFT which was determined in the previous step 25 is determined whether or not it is in the upper-most shift position (in the embodiment according to the present invention, the transmission is shown having five gear shifting steps). If the result of the decision is SFT=5, the program terminates since no shift-up operation is possible above the fifth speed. However, if the result of the decision is SFT≠5, the operation now moves to the next step 31.

In the step 31, the current horse power PS is calculated from the current engine load Q/N and the engine speed N and then the operation moves to the next step.

In the step 32, when one shift-up operation is performed from the current shift position SFT, the expected engine speed N' (when SFT+1) necessary for maintaining the same car speed is calculated from the gear ratio of the transmission 5 and then the operation moves to the next step.

In the step 33, a decision-making is performed whether or not the engine speed N' (SFT+1) calculated in the step 32 is less than a predetermined lower engine speed, for instance, 1000 rev. per minute. If the result of the decision is that the engine speed is lowwer than the predetermined speed, the execution of the program terminates as the vibration of the engine may become large when shift-up operation is performed. However, if the result of the decision is NO, i.e. it is more than 1000 rev. per minute, the operation moves to the next step.

In the step 34, the expected horse power P'S' and the engine load Q'/N' (SFT+1) necessary for maintaining the current car speed V when one step shifting up (SFT+1) is calculated from the expected engine speed N' (SFT+1), which was calculated in the step 32, as well as from the horse power P calculated in the step 31, and the operation then moves to the next step.

In the step 35, a decision is made whether or not the expected engine load Q'/N' (SFT+1) is larger than the corresponding engine load Y on the line A—A at the of engine speed N' (SFT+1). If the result of the decision is Q'/N' (SFT+1)>Y, the execution of the program terminates without further executing the subsequent steps 37 and 38 for the shifting-up indication since it is preferable to perform shift-down operation in the next program execution. However, if the result of the decision is NO, i.e. Q'/N' (SFT+1)≦Y, the operation then moves to the next step 36.

In the step 36, a decision is made if whether the engine load Q'/N' (SFT+1) after shifting up is larger than the engine load β on the line B—B. If the engine load Q'/N' (SFT+1) is larger than β, the execution of the program terminates without further execution of operations for indicating shift-up operation to be performed since the fuel consumption rate remains unchanged. However, if the result of the decision is NO, i.e., Q'/N' (SFT+1)≦β, the operation moves to the next steps 37 and 38 for indicating the shift-up operation to be performed by the driver.

Figure 10:
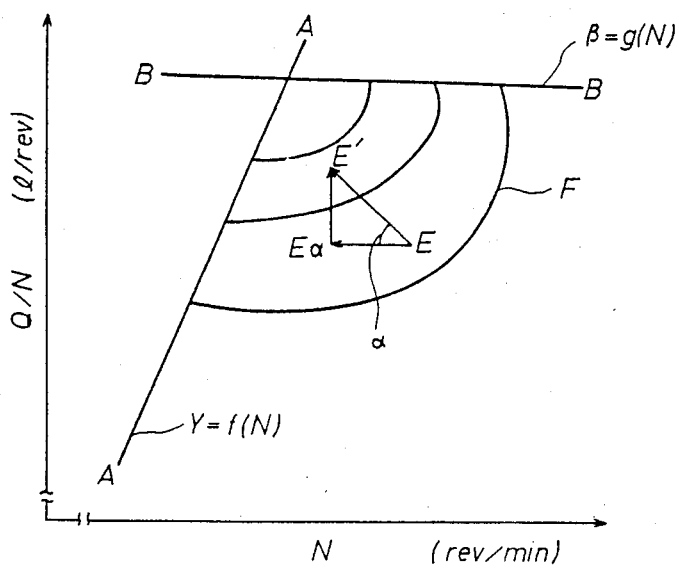
FIG. 10 illustrates a portion of an enlarged fuel data map of FIG. 7 explaining the operation of the fuel data map and for calculating engine load in another zone.

Now, the detailed explanation of the steps 35 and 36 will be made with reference to the FIG. 10 which is a partially enlarged view of FIG. 7. In FIG. 10, when one shift-up operation is performed by maintaining the car speed V and the horse power P at the point E in the figure, the engine load Q/N increases from Eα to E' while the engine speed N lowers or decreases from E to Eα, and the fuel consumption rate becomes the point E', that is, it moves to the point E'. Accordingly, it is clear that the fuel consumption rate is preferable at the point E' rather than the point E judging from the equal fuel consumption rate curves F so that shift-up operation is preferable in this case. As a result, the step necessary for shift-up operation indication are performed in the steps 37 and 38.

In the step 37, a delay time operation similar to that described in step 40 is performed and the operation then moves to the next step.

In the step 38, an operation for generating shift-up indication on the indicator 10 is performed and after that the program terminates.

As stated in the foregoing, in the method according to the present invention, known equal fuel consumption rate curves defined by the engine speed N and engine load Q/N are divided into four sections or zones by first and second engine load operation functions Y=f (N) and β=g(N), respectively. The current fuel consumption rate for current running conditions is calculated from the equal fuel consumption rate curves. If the fuel consumption rate thus calculated belongs to zones Z or Z', a shift-down indication is performed since the fuel consumption rate can be improved and still maintain the current car speed V and the current horse power PS, and, if the fuel consumption rate calculated belongs to zone X of the fuel consumption rate curves, no shift indication is carried out since the fuel consumption rate cannot be improved even if a shift-up or shift-down operation is performed. And finally, if the fuel consumption rate calculated above belongs to zone W of the curves, a shift-up indication is made, subject to the condition that the fuel consumption rate after shifting up does not belong to any other zones of the curves; thus improving the fuel consumption rate.

Moreover, in the embodiment according to the present invention, the line A—A is shown as a straight line which is expressed by a primary function. However, it may also be a curve which is expressed by a secondary function which approximates a line connecting the smallest points of engine load Q/N on each equal fuel consumption rate curve F.

Moreover, various calculations may also be made in accordance with the engine torque, intake manifold, negative pressure, or fuel injection amount (fuel injection time) in a vehicle equipped with an electronic fuel injection control unit, instead of engine load Q/N, which values are all proportional to the engine load.

Figure 11:
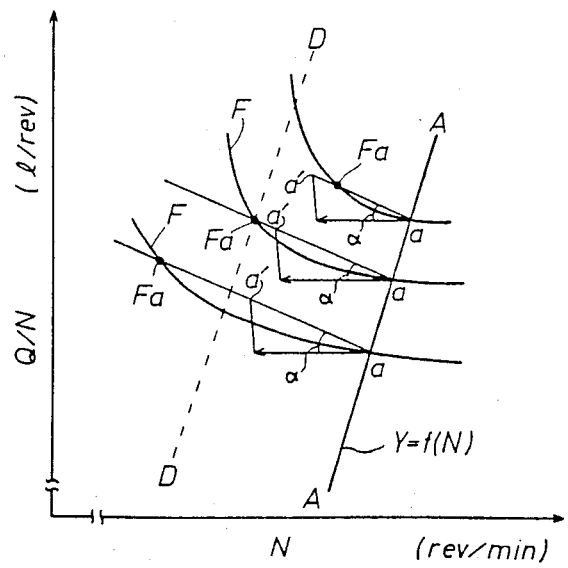
FIG. 11 illustrates a portion of the fuel data map for explaining the operation of fuel consumption rates when the transmission is shifted.

Furthermore, in the embodiment according to the present invention as shown in FIG. 11, firstly the fuel consumption rate at the points a' when shift-up operation has been performed is calculated from the current fuel consumption rate at the cross points a of the equal fuel consumption rate curves and the line A—A; then the cross points Fa between the straight line a—a' and each equal fuel consumption curve F is calculated respectively; and finally the line D—D parallel to the line A—A can be drawn within the discrepancy of each point Fa. Accordingly, as a result, as shown in FIG. 7 the zones may be divided by this line D—D or it may also be divided by the line C—C parallel to the line B—B. In the zones defined by the line C—C and the line D—D, no change is perceived with respect to the fuel consumption rate even if the shift-down operation is performed. However, noise can be reduced by an amount equal to the reduction in the engine speed, thus improving engine life.

As stated in the foregoing, the method for indicating gear shifting operation according to one aspect of the present invention may comprise the steps of calculating current engine load Q/N from the intake air flow Q and the engine speed N, comparing the current engine load thus calculated with a predetermined engine load constant, calculating current shift position from the result of the comparison, seeking a first engine load operation function Y=F (N) and a second engine load operation function β=g (N) from known equal fuel consumption rate curves, comparing the first engine load operation function Y thus sought with said current engine load Q/N, and indicating either shift-up or shift-down operation to be performed in accordance with the result of the comparison.

According to the present invention, since preferable shift positions to be performed in the optimum fuel consumption rate can be indicated to a driver in order to maintain current car speed during the running of car, only the shifting operation by the driver in accordance with the shift change indications is necessary to thereby enable the maximum engine fuel consumption performance to be carried out during running.

Furthermore, according to the present invention a memory with large capacity for storing a large number of data can be dispensed with and the control unit can be made small with a result reduced cost.

The detailed description of the preferred embodiment according to the present invention has been made with reference to the drawings. However, it is apparent that various changes and modifications are possible without departing from the scope and spirit of the present invention.

What is claimed is:

1. A method for indicating gear shifting operation for a vehicle transmission, comprising the steps of;
    calculating current engine load Q/N from the intake air flow Q and the engine speed N;
    comparing said current engine load thus calculated with a predetermined engine load constant;
    re-starting at the first step of the method if said comparison finds said current engine load less than or equal to said predetermined constant;
    calculating current shift position from current engine speed N, current vehicle speed V and the known transmission gear ratio;

determining a first engine load operation function Y=f (N) and a second operating engine load function B=g (N) from known equal fuel consumption rate curves;
comparing said first operating load operation function Y with said current engine load Q/N;
indicating a shift-down operation to be performed if said first function has a value greater than said current engine load Q/N;
performing additional steps for potential shift-up operation indication if said first function has a value less than or equal to said current engine load Q/N; calculating current engine horsepower PS from said current engine speed N and current engine load Q/N; and
calculating expected engine speed N' necessary for maintaining said current car speed V if there is a one shift-up operation performed on said transmission.

2. A method as in claim 1, further comprising the step of:
determining if said current shift position is in the neutral position.

3. A method as in claim 1, wherein the method further comprises the step of determining whether said current engine load Q/N is above said second engine load operation function β.

4. A method as in claim 3, wherein the method further comprises the step of perfoming no gear shifting operation indications if said current engine load Q/N is higher than said second engine load operation function β.

5. A method as in claim 1, wherein said method further comprises the steps of comparing said expected engine speed N' with a second predetermined constant, and calculating expected engine horse power P'S' and expected engine load Q'/N' when one shift-up operation is performed in accordance with said calculated horse power PS and said expected engine speed N'.

6. A method as set forth in claim 5, wherein the method further comprises the steps of determining whether said expected engine load Q'/N' is above both said first engine load operation function Y=f (N) and said second engine load operation function β=g (N), and indicating a shift-up operation if so determined.

7. A method as set forth in claim 1, wherein the method further comprises the step of storing in advance a fuel consumption rate curve map in a read only memory for use in various engine load calculations.

8. A method for indicating gear shifting operation as set forth in claim 1, wherein said first and second engine load operation functions are straight lines, respectively.

9. A method for indicating gear shifting operation as set forth in claim 1, wherein the said first and second engine load operation functions are curves, respectively.

10. A gear shifting operation indication apparatus comprising:
an engine rotation sensor for detecting current engine speed;
a speed meter for detecting actual speed of a car;
an air flow meter for detecting an intake arir flow;
control unit means, responsive to said sensor and said meters, for determining shifting operation indications;
an indicator, responsive to said control unit means, for indicating either shift-up or shift-down operation based on said control means determinations;
said control unit means comprising means for
calculating current engine load Q/N from the intake air flow Q and the engine speed N,
comparing said current engine load thus calculated with a predetermined engine load constant,
recalculating said current engine load if said comparison finds said current engine load less than or equal to said predetermined constant,
calculating current shift position from current engine speed N, current vehicle speed V and the known transmission gear ratio,
determining a first engine load operation function Y=f (N) and a second operating engine load function β=g (N) from known equal fuel consumption rate curves,
compring said first operating load operation function Y with said current engine load Q/N,
indicating a shift-down operation to be performed if said first function has a value greater than said current engine load Q/N,
performing additional functions for indicating subsequent shift-up operation if said first function has a value less than or equal to said current engine load Q/N,
calculating current engine horsepower PS from said current engine speed N and current engine load Q/N, and
calculating expected engine speed N' necessary for maintaining said current car speed V if there is a one shift-up operation performed on said transmission.

11. A method for indicating gear shifting operation for a vehicle transmission, comprising the steps of;
calculating current engine load Q/N from the intake air flow Q and the engine speed N;
comparing said current engine load thus calculated with a predetermined engine load constant;
re-starting at the first step of the method if said comparison finds said current engine load less than or equal to said predetermined constant;
calculating current shift position from current engine speed N, current vehicle speed V and the known transmission gear ratio;
determining a first engine load operation function Y=f (N) and a second operating engine load function β=g (N) from known equal fuel consumption rate curves;
comparing said first operating load operation function Y with said current engine load Q/N;
indicating a shift-down operation to be performed if said first function has a value greater than said current engine load Q/N;
performing additional steps for potential shift-up operation indication if said first function has a value less than or equal to said current engine load Q/N;
establishing a data map based on said current engine speed N and current engine load Q/N;
dividing said map into roughly four quadrants by said first and second engine load operation functions;
indicating a shift-up operation when said calculated engine load is in a lower right-hand quadrant;
indicating a shift-down operation when said calculated engine load is in either of the left-hand quadrants; and
indicating no shifting operations when said engine load is in the upper right-hand quadrant of said data map.

12. A gear shifting operation indication apparatus comprising:
   an engine rotation sensor for detecting current engine speed;
   a speed meter for detecting actual speed of a car;
   an air flow meter for detecting an intake air flow;
   control unit means, responsive to said sensor and sait meters, for determining shifting operation indications;
   an indicator, responsive to said control unit means, for indicating either shift-up or shift-down operation based on said control means determinations; and
   said control unit means including means for calculating current engine load Q/N from the intake air flow Q and the engine speed N,
   comparing said current engine load thus calculated with a predetermined engine load constant,
   recalculating said current engine load if said comparison finds said current engine load less than or equal to said predetermined constant,
   calculating current shift position from current engine speed N, current vehicle speed V and the known transmission gear ratio,
   determining a first engine load operation function $Y = f(N)$ and a second operating engine load function $\beta = g(N)$ from known equal fuel consumption rate curves,
   comparing said first operating load operation function Y with said current engine load Q/N,
   indicating a shift-down operation to be performed if said first function has a value greater than said current engine load Q/N,
   performing additional functions for indicating subsequent shift-up operation if said first function has a value less than or equal to said current engine load Q/N,
   establishing a data map based on said current engine speed N and current engine load Q/N,
   dividing said map into roughly four quadrants by said first engine load operation function Y and said second engine load operation function $\beta$.
   indicating a shift-up operation when said calculated engine load is in a lower right-hand quadrant,
   indicating a shift-down operation when said calculated engine load is in either of the left-hand quadrants, and
   indicating no shifting operations when said engine load is in the upper right-hand quadrant of said data map.

13. Method for indicating optimum gear shift operation for minimizing fuel consumption in a vehicle having a manual transmission, detecting means for detecting various engine parameters, a microprocessor including a read-only memory, a random-access memory, and a central processing unit for maintaining constant vehicle speed and constant engine power responsive to signals from said detecting means and for outputting an indicating signal indicative of the optimum gear shift operation, and indicating means responsive to said indicating signal for indicating said gear shift operation, said method comprising the steps of:
   (a) storing isometric curved lines that represent curves of equal fuel-consumption as defined on a load/speed diagram, and separating said map into three areas by two curves, one curve represented by $Y = f(N)$ and crossing the points representing the minimum fuel consumption rate of each of said isometric curved lines and the other curve represented by $\beta = g(N)$, for determining whether engine load is defined as high, wherein said three areas defined on said map comprise:
      a first area (I) in which the value Y corresponds to a currently detected engine speed which is less than the current engine load;
      a second area (II) in which the value of Y corresponds to the detected engine speed being more than the value of the current engine load with the value corresponding to the detected engine speed being more than the current engine load; and
      a third area (III) in which the value of Y corresponding to the detected engine speed is more than the value of engine load with the value corresponding to currently detected engine load being less than the current engine load;
   (b) outputting a signal from said microprocessor to said indicating means to cause said indicating means to output a signal indicative of one-step downshifting, whenever the detected point determined by a combination of said detected engine speed and said engine load is in said first area;
   (c) indicating no gear changing operation if said detected point is in said second area; and
   (d) outputting a signal from said microprocessor to said indicating means to cause said indicating means to output a signal indicative of one-step upshifting, whenever said detected point determined by said combination of said detected engine speed and engine load is in said third area.

14. A method as in claim 13 wherein step (d) further comprises the steps of:
   (d1) calculating current engine power and one-step upshifted engine speed from the current shift position, based on the known gear ratio of the vehicle transmission;
   (d2) calculating one-step upshifted engine load of the engine power and the engine shift calculated in step (d1); and
   (d3) then causing said microprocessor to output a signal indicative of upshifting to said indicating means, whenever said detected point is in said third area.

15. A method as in claim 13 wherein said microprocessor executes said steps (a)–(d) only if the current engine load is less than a first predetermined value, the current engine speed is more than a second predetermined value, and the present shift position is other than neutral.

16. A method as in claim 14, wherein said steps (d1) and (d2) are performed only whenever said engine speed is within a predetermined range.

17. A method as in claim 13 wherein said microprocessor does not indicate one-step upshifting whenever the present shift position is in the highest gear, does not indicate one-step downshifting whenever the present shift position is in the lowest gear, and in any event indicates upshifting and downshifting only after a delay time has elapsed.

* * * * *